June 2, 1959   J. F. HAYDEN   2,889,123
SPOOL AND SPINDLE ASSEMBLY
Filed Dec. 5, 1955   2 Sheets-Sheet 2
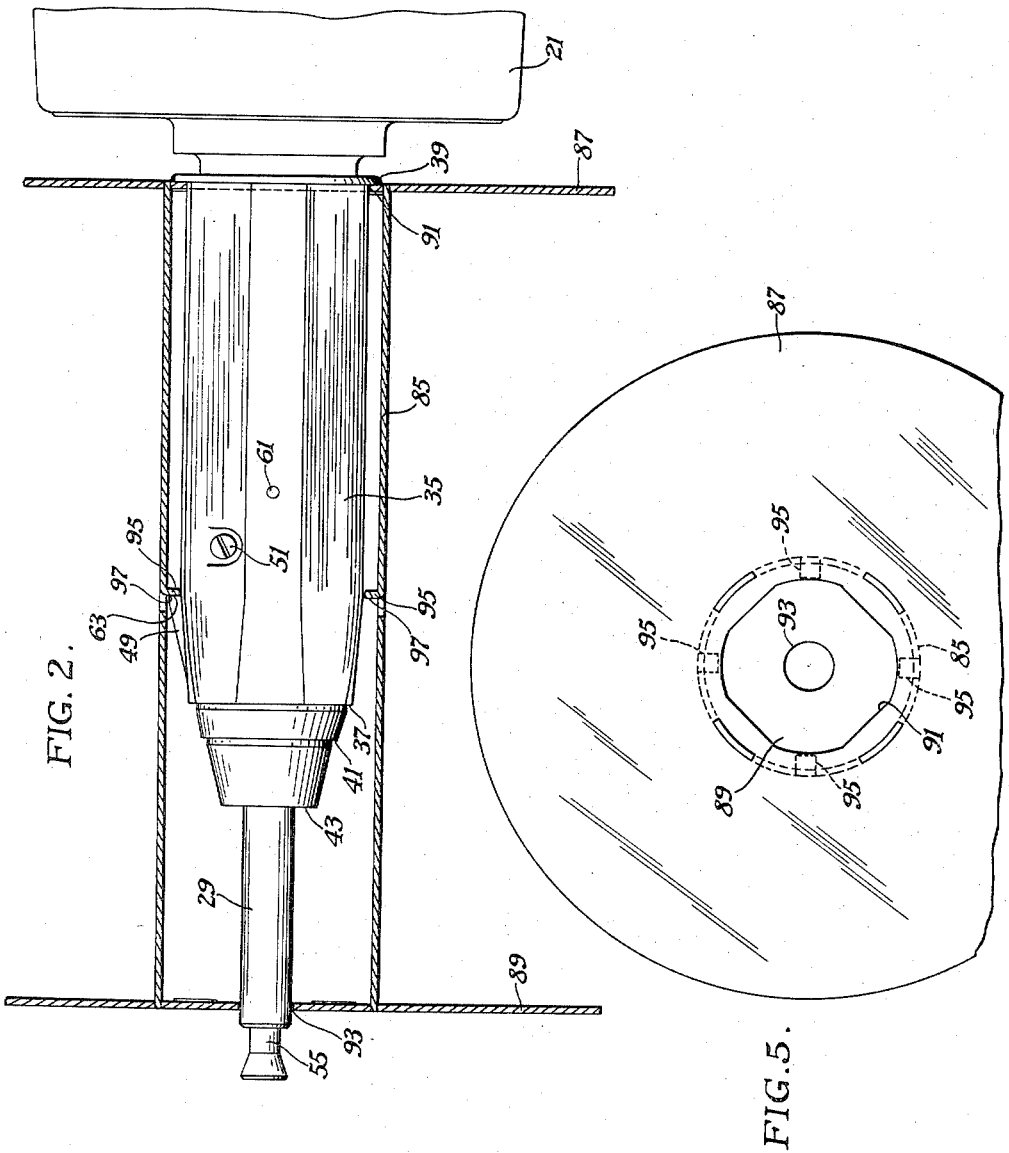
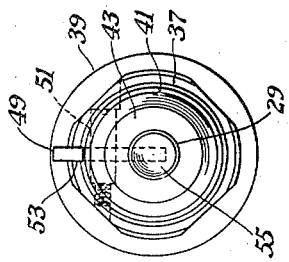
JAMES F. HAYDEN
INVENTOR.
BY Daniel I. Mayne
Paul R. Holmes
ATTORNEYS

United States Patent Office 2,889,123
Patented June 2, 1959

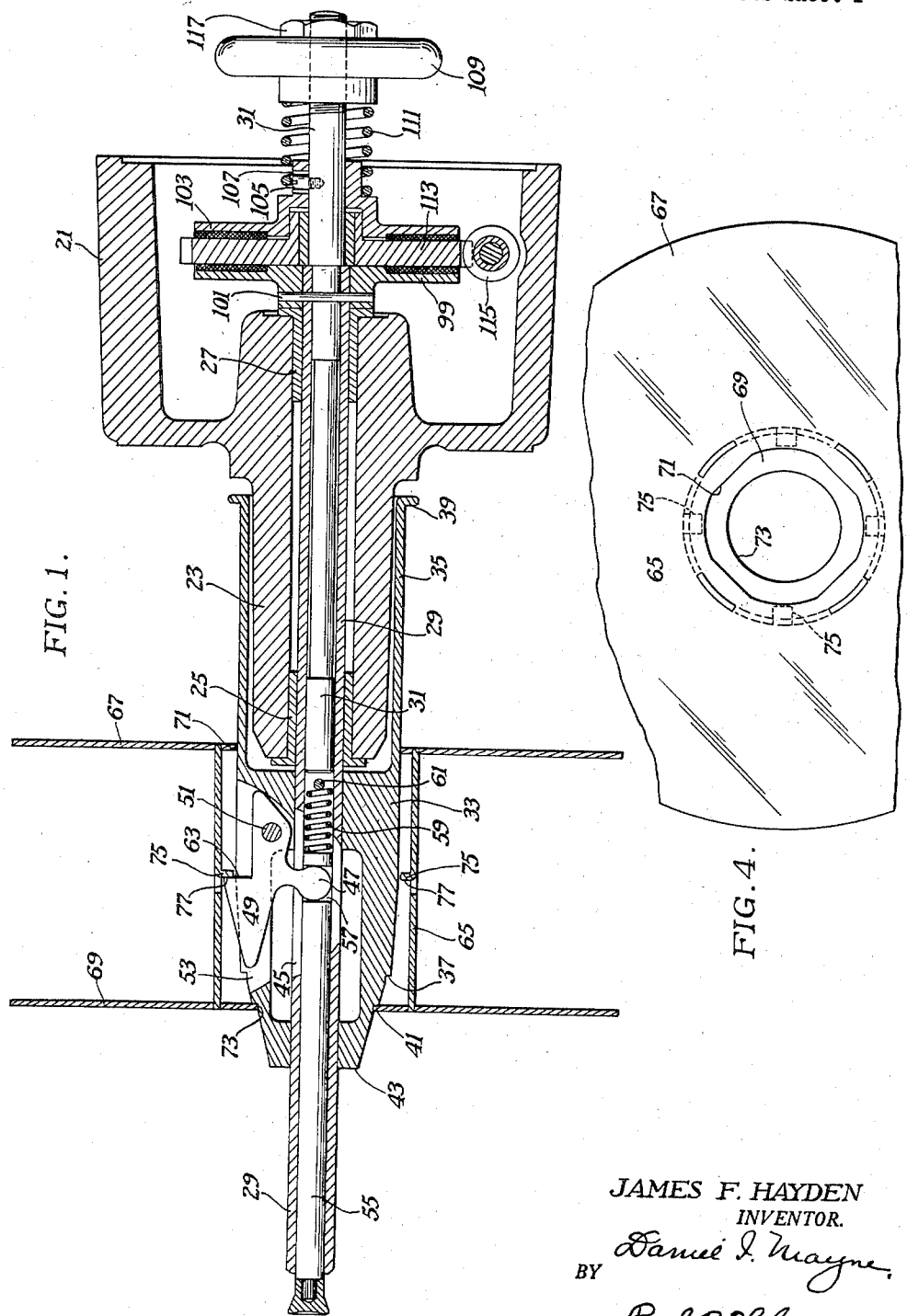

2,889,123

SPOOL AND SPINDLE ASSEMBLY

James F. Hayden, Rochester, N.Y., assignor to Eastman Kodak Company, Rochester, N.Y., a corporation of New Jersey Application December 5, 1955, Serial No. 551,175

2 Claims. (Cl. 242—68.3)

This invention relates to spindles and more particularly to spindles for use in photographic apparatus in which it is desired to use interchangeably any one of several width film spools each carrying a corresponding width film strip.

As is well known in the art, one of the difficulties encountered in using photographic apparatus for copying documents arises from nonuniformity in document size resulting in the desirability of utilizing several optical systems to vary the image reduction ratio and/or to utilize different width film recording strips. This permits one to select the combination of optical system and width of film strip which will utilize the maximum area on the film strip for recording the image of a given size document. This feature is almost mandatory in photocomposing apparatus of the type disclosed in U.S. application Serial No. 326,938 entitled, "Strip Material Advancing Mechanism" filed December 19, 1952, which issued as Patent No. 2,738,704 on March 20, 1956, and of which I am a coinventor. That photocomposing apparatus is of the type which rapidly and automatically photographs the printed matter contained in discrete areas of previously prepared cards which are rapidly advanced through the exposure station in the machine. It will be readily appreciated that in this type of apparatus, it is often desirable to vary the size and/or length of the printed matter on the cards and in such instances, different widths of film strip are frequently required.

With the apparatus of the known prior art, a change in width of the film strip was not easily made for the reason that it was necessary to remove and replace the spindle with a spindle which would accept and correctly position the different width film spool so that the center of the film strip on the different width spool occupies the same position formerly occupied by the center of the film strip on the replaced film spool. This operation was thus both laborious and time consuming.

My invention avoids these disadvantages of the known prior art and permits the correct location of any one of several different width film spools carrying corresponding width film strips, without the necessity of removing and replacing the mounting spindle. The term center plane as used with reference to a spool in the specification and claims is intended to define that plane which is perpendicular to the longitudinal axis of the spool and equally distant from the spool flanges. The spindle of my invention is made with a substantially square cross sectional configuration permitting the rotation of the spindle to be transmitted to the film spool through the inner flange of the film spool. The inner flange of the film spool is provided with a mounting aperture having a shape similar to the cross-sectional configuration of the spindle. The outer flanges of the different width film spools are provided with circular mounting holes of different diameters. The spindle is provided with a series of stepped annular shoulders, each shoulder having a diameter permitting abutment with a flange of one specific width film spool to thereby locate the center planes of the different width spools in the same position with respect to the spindle. A spring biased pivotally mounted detent in the spindle engages a radially inwardly directed tab provided at the center of each film spool to thereby retain the flange of the film spool in tight abutment with the proper corresponding annular shoulder on the spindle. The film spool is releasable from the spindle by depressing a plunger which protrudes from the end of the spindle thereby pivoting the detent against the spring bias and away from the inwardly directed tab of the film spool.

The primary object of the present invention is, therefore, to provide a spindle for mounting any one of several different width spools thereon.

Another object of the present invention is to provide a spindle for mounting any one of several different width spools for rotation therewith, the center plane of each spool when properly mounted being identically positioned with respect to the spindle regardless of the width of the spool.

Yet another object of the present invention is to provide a spindle utilizing a series of stepped annular shoulders and a spring biased detent for retaining any one of several different width spools thereon and for locating the center plane of each spool in an identical position with respect to the spindle regardless of the width of the spool.

Still other objects and advantages of the present invention will become readily apparent to those skilled in the art from the following description with reference to the drawings in which like characters denote like parts and wherein:

Fig. 1 is a cross sectional view of the spindle and a film spool mounted thereon according to my invention;

Fig. 2 is an elevation view of the spindle illustrated in Fig. 1 and with a large width film spool shown in cross section and mounted thereon;

Fig. 3 is an end view of the spindle; and

Fig. 4 and Fig. 5 are end views of the film spools illustrated in Figs. 1 and 2 respectively.

As shown in Fig. 1, the spindle according to my invention comprises a support 21 having an elongated nose portion 23. Thrust bearings 25 and 27 are positioned in the opposed ends of nose portion 23 and provide bearing support for the spindle sleeve 29 and the associated shaft 31. Spindle housing 33 is mounted on spindle sleeve 29 and is provided with a tubular end portion 35 which receives and surrounds nose portion 23 in spaced relation thereto. Spindle housing 33 has a substantially square cross-sectional configuration between annular shoulder 37 and the annular shoulder or end flange 39, as will be apparent from an inspection of Fig. 3. The spindle housing is also provided with an annular shoulder 41 having a diameter less than the diameter of shoulder 37, and an annular shoulder 43 having a diameter less than the diameter of shoulder 41. The purpose of the series of annular shoulders 43, 41, 37 and 39 will be hereinafter more fully described.

Spindle sleeve 29 is provided with a slot 45 which extends completely through the sleeve 29 and has a width sufficient to accommodate the follower portion 47 of detent 49 which is pivoted on a pin 51 located in the spindle housing 33 and best illustrated in Fig. 2 and Fig. 3. Again referring to Fig. 1, housing 33 is provided with a radial slot 53 of sufficient width to permit detent 49 to pivot freely on pin 51. A plunger 55 is provided with a slot 57 of sufficient width and length to accommodate the follower portion 47 of detent 49 and acts as a cam surface therefor. Plunger 55 is biased to an extreme outward position with respect to sleeve 29 as illustrated in Fig. 1 by means of spring 59 which is under compression between stop pin 61 and the end of plunger 55. Detent 49 is provided with an engaging surface 63, the purpose of which will be hereinafter disclosed. Pin 61 passes through housing 33 and sleeve 29 whereby the housing 33 and sleeve 29 rotate together as a unit.

In Fig. 1 and Fig. 4 is illustrated one of the film spools utilized according to my invention. The film spool comprises a tubular hub 65 on the opposing ends of which are mounted the usual spool flanges 67 and 69. The aperture 71 in the inner flange 67 has the same configuration and size as the outside of the end portion 35 of spindle housing 33. The outer flange 69 is provided with a circular aperture 73 which has a diameter sufficient to permit the flange 69 to abut the annular shoulder 41. Four tabs 75 are equally spaced around the inner periphery of the hub 65 and extend radially inwardly toward the longitudinal axis of the film spool. The surface 77 of tab 75 is equally distant from the spool flanges 67 and 69, and is of sufficient radial extent to be engaged by the engaging surface 63 of detent 49. The annular shoulder 41 is positioned at a distance from the engaging surface 63 of detent 49 to just permit abutment with flange 69 and engagement of surface 63 with surface 77 of the tabs 75. Thus, by this construction, it will be evident that the center plane of the film spool and necessarily the center of the film strip (not shown) which is wound on the spool tightly between flanges 67 and 69 will coincide with the plane formed by surfaces 77 on tabs 75.

In Figs. 2 and 5 I have illustrated another film spool utilized according to my invention. This film spool comprises a hub 85 on the opposed ends of which are mounted spool flanges 87 and 89. The aperture 91 in the inner flange 87 has the same configuration and size as the end portion 35 of spindle housing 33 whereby the flange 87 will slide onto the housing 33 and will abut shoulder 39. The outer flange 89 is provided with a small circular aperture 93, whereby flange 89 is supported on the spindle sleeve 29 when the spool is mounted in position on the spindle. As was described with respect to the film spool illustrated in Fig. 1 and Fig. 3, the four equally spaced inwardly directed tabs 95 having surfaces 97 equally distant from flanges 87 and 89, are of sufficient radial extent to be engaged by engaging surface 63 of detent 49. The distance between the surface 63 and annular shoulder 39 is just sufficient to permit the surface 63 to engage the surface 97 on one of the tabs 95 when flange 89 is in abutment with the annular shoulder 39. Thus the center plane of the film spool and necessarily the center of the film strip (not shown) which is wound on the spool tightly between flanges 87 and 89 will coincide with the plane containing the engaging surface 63 of detent 49 and the surfaces 97 of tabs 95. Similarly, it will be noted that the center plane of the small film spool occupies exactly the same position with respect to the spindle when properly mounted thereon, as does the center plane of the larger film spool.

Spindle sleeve 29 and shaft 31 are driven through a friction clutch which comprises a friction plate 99 which is rigidly attached to shaft 31 by a pin 101, a second friction plate 103 which is held against rotation with respect to shaft 31 by shouldered screw 105 but permitted to move axially with respect to shaft 31 within the limits defined by elongate slot 107 which receives screw 105, an adjustable knob 109 screwed on shaft 31, and a coil compression spring 111 positioned between knob 109 and friction plate 103 for biasing the friction plates 99 and 103 into driving engagement with helical gear 113. Helical gear 113 which is freely rotatable with respect to shaft 31 is driven through worm 115 by any suitable means such as a motor (not shown). Thus the amount of slippage permitted by the clutch can be easily controlled by adjusting the position of knob 109 on shaft 31, thereby varying the biasing force of spring 111. Knob 109 is retained in position on shaft 31 by means of lock nut 117. Rotation imparted to spindle sleeve 29 and shaft 31 is transmitted to spindle housing 33 through pin 61, and from the housing 33 to the film spool through the flange thereof which is mounted on the portion of housing 33 having a substantially square cross-sectional configuration.

While I have shown only two film spools which are alternatively mountable on the spindle, in the practice of my invention, I also utilize a film spool of a width to abut annular shoulder 37 and a film spool of a width to abut annular shoulder 43. In both these instances tabs are provided similar to tabs 75 and 95 having surfaces similar to surfaces 77 and 97 positioned equally distant from the opposed flanges of the film spool. When either of these film spools is properly mounted on the spindle with the outer flange in abutment with the proper annular shoulder, one of the inwardly directed tabs is engaged by the surface 63 of detent 49, and the center plane of the film spool and necessarily the center of the film strip (not shown) wound on the spool tightly between the opposed flanges thereof, is always in the same position with respect to the spindle, which position exactly coincides with the position described with respect to the center plane of the illustrated film spools and the center of the film strips which would be wound tightly between the opposed flanges thereof.

From the foregoing description, it is evident that the spindle utilized according to my invention permits any one of several different width film spools to be mounted for rotation therewith, and that regardless of which width of the film spool is mounted on the spindle, the center plane of the film spool and necessarily the center of the film strip wound on the spool, said film strip having the same width as the distance between the flanges of the spool, is always located in exactly the same position with respect to the spindle.

While I have disclosed my invention as utilized with photographic apparatus, it will be appreciated by those skilled in the art that the illustrated spindle and spools could be used in any application where it is desired to be able to utilize spools of various different widths without also having to utilize different spindles. Similarly it is evident that more or fewer different width spools could be accommodated by the spindle by merely providing more or fewer annular shoulders in the series of stepped annular shoulders on the spindle housing, and by providing circular apertures in the flange of the spools of a size to permit abutment with the proper annular shoulder. It should also be understood that in practicing the invention the detent engaged surfaces on the tabs in the hub of the spools need not necessarily be equally distant from the opposed spool flanges and can be varied as desired so long as the position of the detent on the spindle is changed accordingly, whereby the surface of the tab is engaged by the detent when the spool flange is in abutment with the corresponding annular shoulder on the spindle and the center plane of the spool occupies the same position relative to the spindle regardless of the width of the spool mounted on the spindle.

These and other modifications are possible and will be readily apparent to those skilled in the art from the foregoing description and, therefore, the disclosure is intended to be only illustrative and the scope of the invention is defined in the appended claims.

Having now particularly described my invention what I desire to secure by Letters Patent of the United States and what I claim is:

1. A spindle for selectively receiving any one of a plurality of different width spools, each of said spools having two end flanges formed with axial mounting apertures and each spool having a center plane located equidistant from said end flanges, said spindle comprising an elongate housing having a plurality of longitudinally spaced annular shoulders thereon, said shoulders being of progressively increasing diameters and each corresponding to the diameter of the mounting aperture in an end flange of one of the spools whereby each shoulder provides an abutment surface for an end flange of a different width spool, said shoulders being positioned on said housing to locate said center plane of each of said spools in the same position with respect to said housing when mounted thereon and the shoulder of least diameter being formed at one end of said housing, detent means mounted on said housing intermediate the ends thereof for pivotal movement between a first position and a second position, said detent in said first position engaging a spool when mounted on said housing and urging an end flange of the spool into abutment with the corresponding one of said shoulders and in said second position being retracted from engagement with the spool to permit mounting and withdrawal of the spool from said housing, and means for biasing said detent to said first position.

2. A spindle in accordance with claim 1 wherein said housing is formed with a noncircular peripheral configuration corresponding to the configuration of the mounting aperture in one of the end flanges of each spool, whereby when a spool is mounted on said housing, rotation of said housing is transmitted to the spool through said one end flange thereof.

References Cited in the file of this patent

UNITED STATES PATENTS

| | | |
|---|---|---|
| 1,871,230 | Foster et al. | Aug. 9, 1932 |
| 2,254,605 | Foster | Sept. 2, 1941 |